United States Patent [19]

Kaneda et al.

[11] Patent Number: 5,255,255
[45] Date of Patent: Oct. 19, 1993

[54] DISK LOADING DEVICE

[75] Inventors: Masataka Kaneda, Machida; Takashi Suzuki, Tokyo; Hiromi Kameda, Fuchu; Yasuyoshi Kagohashi, Yokohama; Masahiro Watanabe, Sagamihara; Tukasa Nakayama, Yokohama; Hiroto Nishida, Ishikawa, all of Japan

[73] Assignee: Matsushita Electric Industrial, Co., Ltd., Osaka, Japan

[21] Appl. No.: 792,172

[22] Filed: Nov. 14, 1991

[30] Foreign Application Priority Data

Nov. 27, 1990 [JP] Japan .................. 2-328605
Nov. 27, 1990 [JP] Japan .................. 2-328606
Nov. 27, 1990 [JP] Japan .................. 2-328667

[51] Int. Cl.$^5$ .................. G11B 17/04; G11B 25/04
[52] U.S. Cl. .................. 369/77.1; 369/75.1; 369/258; 360/99.07
[58] Field of Search .............. 369/75.1, 75.2, 77.1, 369/77.2, 36, 38; 360/99.02, 99.03, 99.06, 99.07

[56] References Cited

U.S. PATENT DOCUMENTS

| 4,674,079 | 6/1987 | Agostini ....................... 369/77.1 |
| 4,682,320 | 7/1987 | d'Alayer de Costemore d'Arc .................. 369/77.1 |
| 5,038,337 | 8/1991 | Muramatsu et al. .............. 369/77.1 |
| 5,043,832 | 8/1991 | Ueda et al. .................... 360/99.07 |

FOREIGN PATENT DOCUMENTS 2103863  2/1983  United Kingdom ............... 369/75.2

*Primary Examiner*—Stuart S. Levy
*Assistant Examiner*—Paul Ditmyer
*Attorney, Agent, or Firm*—Stevens, Davis, Miller & Mosher

[57] ABSTRACT

There is disclosed a disk loading device capable of transferring a disk without damaging a face of the disk. The disk loading device includes a roller movement mechanism for moving a roller toward and away from a path of transfer of the disk, and a roller drive mechanism for rotating the roller. The roller is brought by the roller movement mechanism into contact with an outer peripheral surface of the inserted disk, so that the disk is transferred by the rotational drive force of the rotating roller in a predetermined direction. For discharging the disk, the outer peripheral surface of the disk is urged by an eject mechanism operatively connected to the roller drive mechanism, so that the disk is ejected.

15 Claims, 19 Drawing Sheets

DISK LOADING DEVICE

BACKGROUND OF THE INVENTION

This invention relates to a disk loading device for use in a compact disk player or the like, and also to a disk loading method.

FIGS. 19 and 20 show a conventional disk loading mechanism. In FIGS. 19 and 20, rubber rollers 50 and 51 disposed parallel to each other are rotated by a rotational drive force of a motor so as to transfer a disk 52 in a direction of a narrow.

In the above prior art, however, since the rubber rollers 50 and 51 are held in contact respectively with the opposite faces (opposite sides) of the disk 52 to load the disk 52, there has been encountered a problem that the face of the disk may be damaged during the disk loading.

SUMMARY OF THE INVENTION

With the above problem of the prior art in view, it is an object of this invention to provide a disk loading device which will not damage the face of a disk.

According to the present invention, there is provided a disk loading device comprising:
- roller drive means for rotating a roller;
- roller movement means for moving the roller toward and away from a path of transfer of a disk;
- disk guide means for guiding the disk along the disk transfer path; and
- ejection means operatively engageable with the roller drive means so as to eject the disk;
- wherein the rotating roller is brought into contact with an outer peripheral surface of the disk so as to transfer the disk by a rotational drive force of the roller.

With this construction of the invention, the roller is brought by the roller movement means into contact with the outer peripheral surface of the disk. As a result, the disk is transferred by the rotational drive force of the rotating roller in the predetermined direction. When the playback or reproduction of information stored in the disk is finished, the ejection means operatively connected to the roller drive means urges the outer peripheral surface of the disk so as to eject the disk. Thus, the disk loading method of the invention is also provided.

The foregoing and other objects, features as well as advantages of the invention will be made clearer from the description of preferred embodiments hereafter referring to drawings.

DESCRIPTION OF THE PREFERRED EMBODIMENTS

Figure 1:
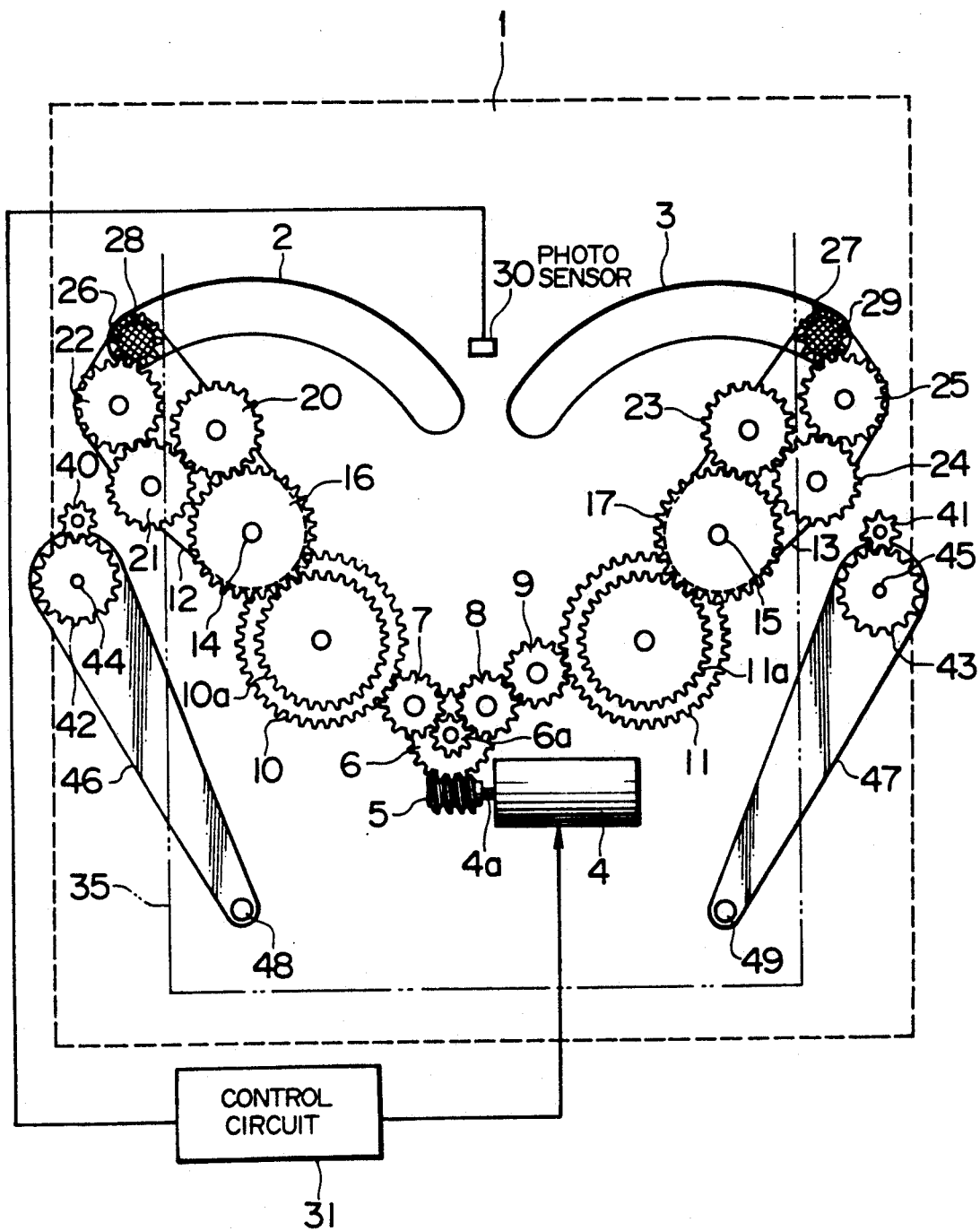
FIG. 1 is a top plan view of a disk loading device according to a first embodiment of the invention.

FIG. 1 shows a first embodiment of a disk loading device of the present invention. In FIG. 1, arcuate guide slots 2 and 3 are formed through a base plate 1. A reversible motor 4 is mounted on a reverse or rear surface of the base plate 1. A worm gear 5 is fixedly mounted on a rotatable shaft 4a of the motor 4, and a helical gear 6 is rotatably supported on the base plate 1, and is in mesh with the worm gear 5. Gears 7 and 8 are rotatably supported on the base plate 1, and are in mesh with a smaller gear portion 6a of the helical gear 6. A gear 9 is rotatably supported on the base plate 1, and is in mesh with the gear 8. Gears 10 and 11 are rotatably supported on the base plate 1, and are in mesh with the gears 7 and 9, respectively. Arms 12 and 13 are pivotally mounted on the base plate 1through respective shafts 14 and 15. Clutch gears 16 and 17 are rotatable about the shafts 14 and 15, respectively. The clutch gears 16 and 17 are in mesh with smaller gear portions 10a and 11a of the gears 10 and 11, respectively. Springs 18 and 19 urges the clutch gears 16 and 17 toward the arms 12 and 13, respectively (see FIG. 2). Gears 20, 21 and 22 are rotatably supported on the arm 12. Gears 23, 24 and 25 are rotatably supported on the arm 13. Gears 26 and 27 are rotatably supported on the arms 12 and 13, respectively, and rubber rollers 28 and 29 are mounted on one ends of the gears 26 and 27, respectively. The rubber rollers 28 and 29 extend respectively through the guide slots 2 and 3, and are projected beyond the upper surface of the base plate 1. Gears 40 and 41 are rotatably supported on the base plate 1, and are meshed respectively with the gears 21 and 24 when the arms 12 and 13 are pivotally moved most remotely away from each other. Clutch gears 42 and 43 are rotatably mounted on shafts 44 and 45, respectively, and ejection arms 46 and 47 are pivotal about shafts 44 and 45, respectively. Pins 48 and 49 are mounted on the distal ends of the ejection arms 46 and 47, respectively. The clutch gears 42 and 43 are urged respectively against the ejection arms 46 and 47 through respective resilient members such as a spring.

Figure 2:
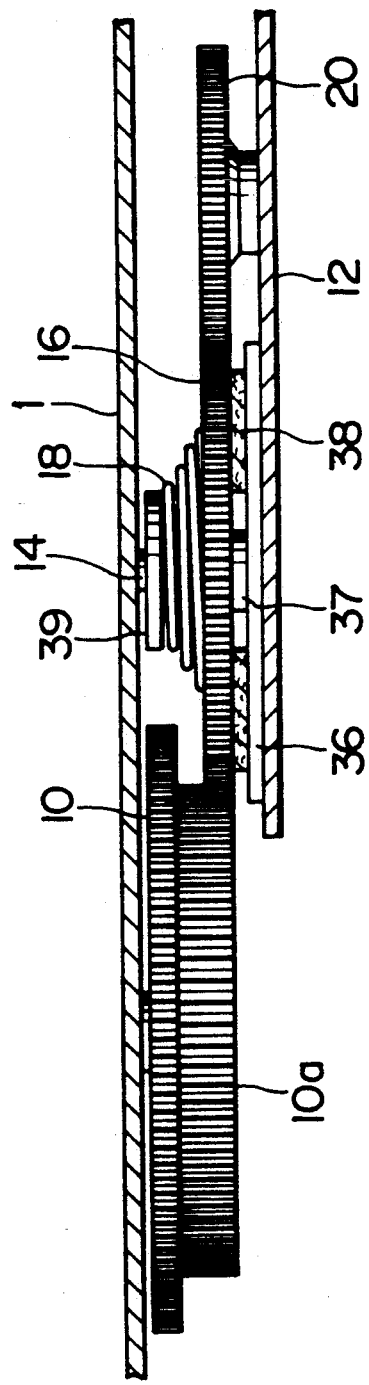
FIG. 2 is a side-elevational view showing a clutch gear portion of the disk loading device of FIG. 1.

FIG. 2 shows a portion of the loading device where the clutch gear 16 is provided. In FIG. 2, the arm 12 is rotatably supported on the base plate 1 through the shaft 14, and a plastic or resin plate 36 is mounted on the arm 12. A cylindrical shaft 37 is formed integrally on the central portion of the resin plate 36. Reference numeral 38 denotes a ring-shaped felt, and the clutch gear 16 is rotatably mounted on the cylindrical shaft 37. The spring 18 is wound around the cylindrical shaft 37, and a ring-shaped retainer plate 39 is fixedly secured to the distal end of the cylindrical shaft 37. The spring 18 is interposed between the retainer plate 39 and the clutch gear 16. The clutch gear 16 is urged by the spring 18, and the felt 38 is held between the clutch gear 16 and the resin plate 36.

In FIG. 1, a rotational drive force of the motor 4 is transmitted to the gear 26 with the rubber roller 28 sequentially via the worm gear 5, the helical gear 6, the gear 7, the gear 10, the gear 16, the gear 20, the gear 21 and the gear 22, so that the rubber roller 28 is rotated in a clockwise direction or in a counterclockwise direction. Also, the rotational drive force of the motor 4 is transmitted to the clutch gear 42 sequentially via the worm gear 5, the helical gear 6, the gear 7, the gear 10, the gear 16, the gear 20, the gear 21 and the gear 40. Similarly, the rotational drive force of the motor 4 is transmitted to the gear 27 with the rubber roller 29 sequentially via the worm gear 5, the helical gear 6, the gear 8, the gear 9, the gear 11, the gear 17, the gear 23, the gear 24 and the gear 25, so that the rubber roller 29 is rotated in a counterclockwise direction or in a clockwise direction. Also, the rotational drive force of the motor 4 is transmitted to the clutch gear 43 sequentially via the worm gear 5, the helical gear 6, the gear 8, the gear 9, the gear 11, the gear 17, the gear 23, the gear 24 and the gear 41. A photo sensor 30 detects the insertion of a disk, and the output of the photo sensor 30 is fed to a control circuit 31. When the photo sensor 30 detects the insertion of the disk, the motor 4 is rotated by the control circuit 31. Reference numeral 35 denotes a disk guide.

Figure 3:
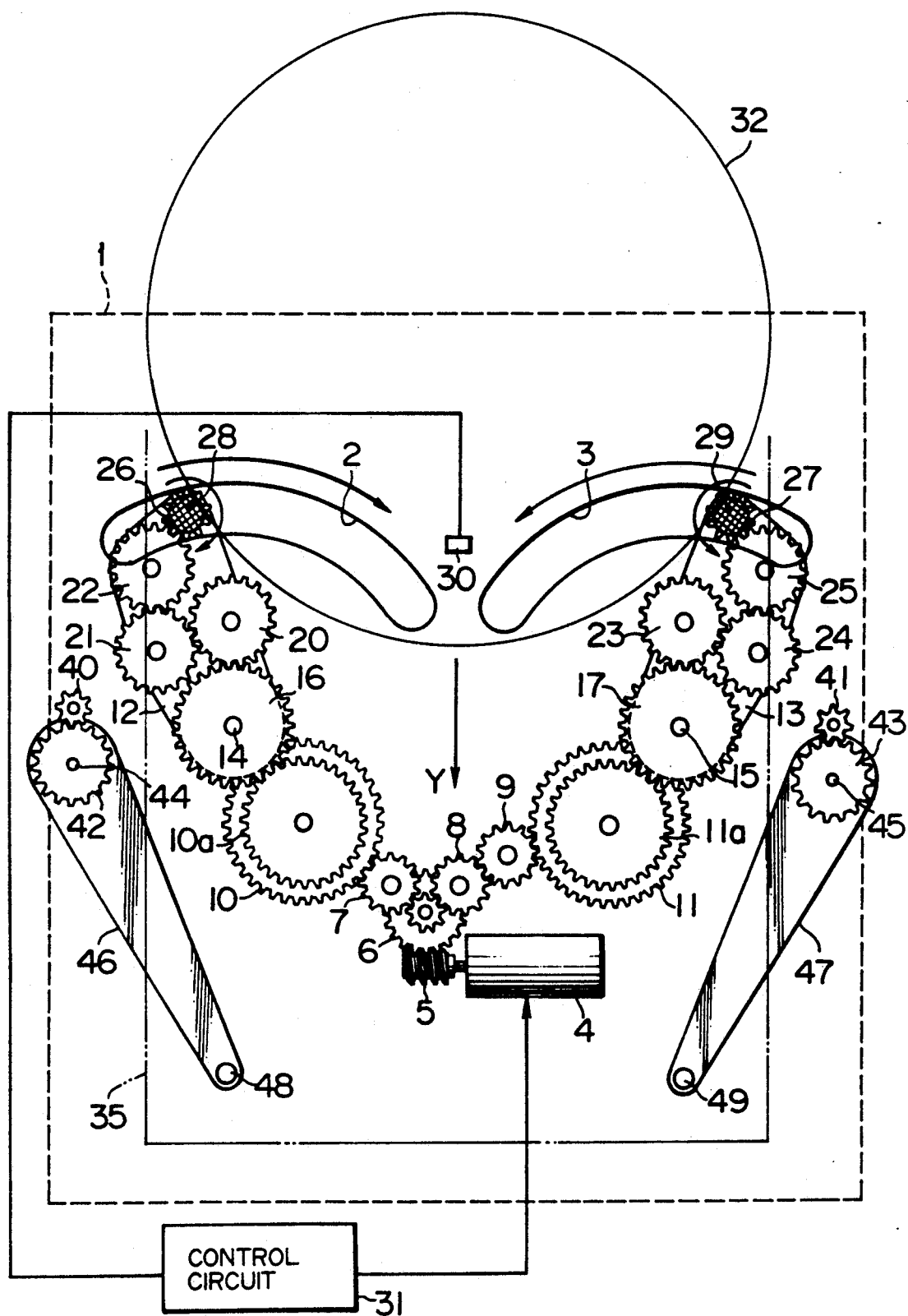
FIGS. 3 to 6 are views similar to FIG. 1, but showing the operation of the disk loading device of FIG. 1.
Figure 4:
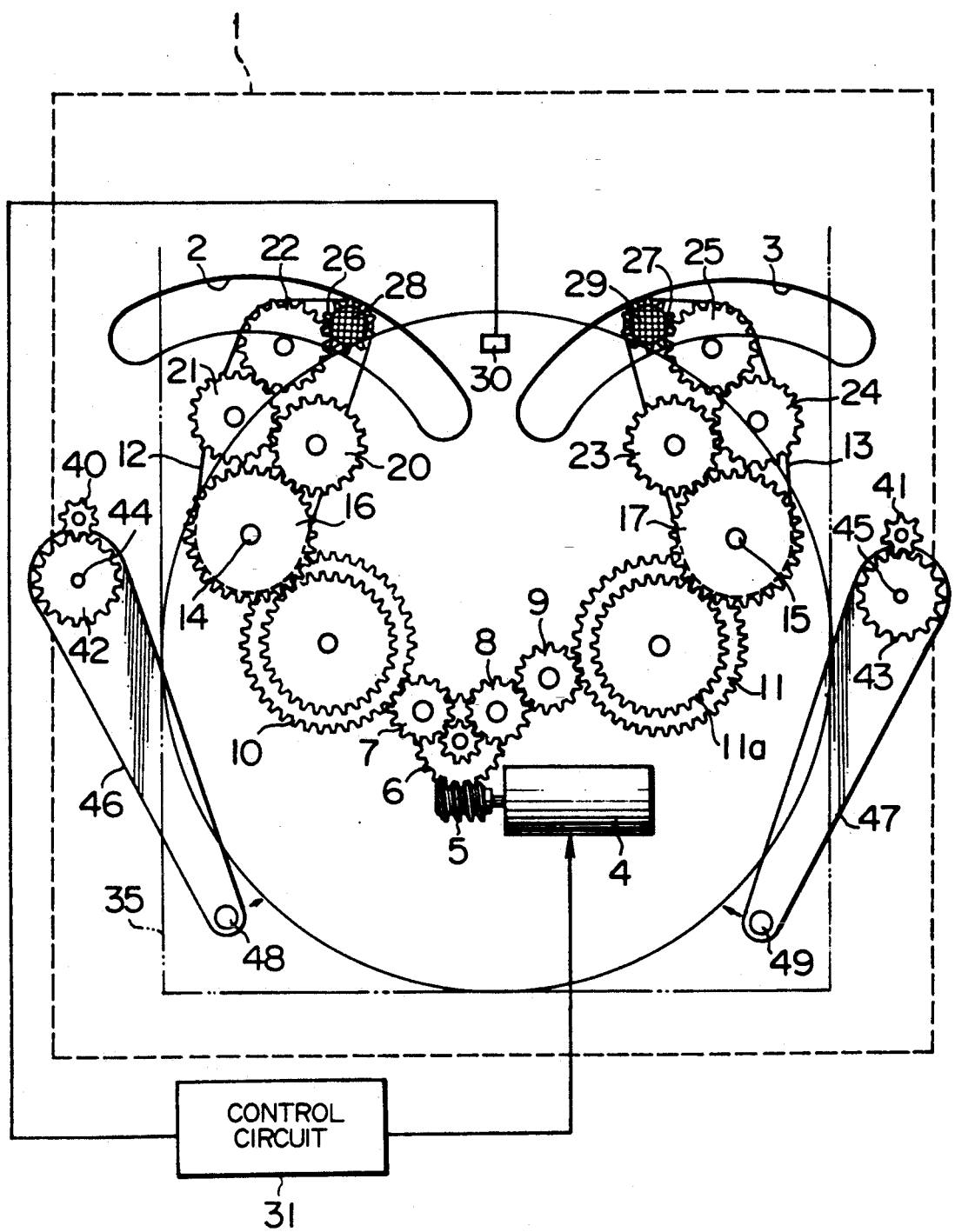

The operation of the above embodiment will now be described. FIG. 3 shows a condition or state in which a large-diameter disk (compact disk of 12 cm) 32 is inserted into a disk insertion hole. When the insertion of the disk 32 is detected by the photo sensor 30, the motor 4 begins to rotate in a first direction by the control circuit 31. The rotational drive force of the motor 4 is transmitted to the gear 26 with the rubber roller 28 sequentially via the worm gear 5, the helical gear 6, the gear 7, the gear 10, the gear 16, the gear 20, the gear 21 and the gear 22 to thereby rotate the rubber roller 28 in a clockwise direction, and at this time the arm 12 is pivotally moved about the shaft 14 in a clockwise direction. Also, the rotational drive force of the motor 4 is transmitted to the gear 27 with the rubber roller 29 sequentially via the worm gear 5, the helical gear 6, the gear 8, the gear 9, the gear 11, the gear 17, the gear 23, the gear 24 and the gear 25 to thereby rotate the rubber roller 29 in a counter-clockwise direction, and at this time the arm 13 is pivotally moved about the shaft 15 in a counterclockwise direction. When the motor 4 thus rotates in the first direction, the arms 12 and 13 are pivotally moved toward each other, and also the rubber rollers 28 and 29 rotate in opposite directions, respectively. As a result of the pivotal movements of the arms 12 and 13, the rotating rubber rollers 28 and 29 are brought into contact with the outer peripheral surface of the inserted disk 32 to move the disk 32 in a direction of arrow Y. FIG. 4 shows a condition or state immediately before the completion of the loading in the direction of arrow Y. When the disk 32 is transferred or moved to a predetermined position by the above loading mechanism, the energization of the motor 4 is stopped, so that the pivotal movements of the arms 12 and 13, as well as the rotations of the rubber rollers 28 and 29, are stopped. When the disk 32 is transferred to the predetermined position, the disk 32 is clamped to a turntable by a clamp mechanism, and is rotated to begin a reproduction operation.

Additional description of the more specific or detailed motion of arms 12, 13 during the loading of the disk 32 is made. The clutch gear 16 engaged or meshed with the gear 10 as shown in FIG. 2 is pivotally moved in one direction (clockwise direction in FIG. 3). As the clutch gear 16 is pressed or urged by the spring 18 toward the arm 12, the arm 12 can be moved together with the clutch gear 16. On the other hand, as the felt 38 and the resin plate 36 are disposed between the arm 12 and the clutch gear 16, the arm 12 can be moved or slip relative to the clutch gear 16. More specifically, the arm 12 can be pivotally moved relative to the clutch gear 16 in the counter-clockwise direction against the clockwise pivotal drive force by the clutch gear 16.

Thus, according to the elapse of time after starting to load the disk 32 shown in FIG. 3, the arm 12 is pivotally moved, at first in the counter-clockwise direction around the shaft 14, and then in the clockwise direction to the state or condition of FIG. 4 where the loading is completed. Similarly, according to the elapse of time after the start of the loading, the other arm 13 is pivotally moved, at first in the clockwise direction, and then in the counter-clockwise direction.

In the disk reproduction condition shown in FIG. 4, when an ejection switch is turned on, the motor 4 begins to rotate in a reverse direction. Therefore, the arms 12 and 13 are pivotally moved away from each other about the respective shafts 14 and 15. When the arms 12 and 13 reach the ends of the guide slots 2 and 3, respectively, the gears 21 and 24 are meshed with the gears 40 and 41, respectively. As a result, the rotational drive force of the motor 4 is transmitted to the gears 40 and 41 through the respective gears 21 and 24, and is further transmitted to the clutch gears 42 and 43, so that the clutch gear 42 rotates in a counterclockwise direction whereas the clutch gear 43 rotates in a clockwise direction. In response to the rotations of the clutch gears 42 and 43, the ejection arm 46 is pivotally moved about the shaft 44 in a counterclockwise direction, and the ejection arm 47 is pivotally moved about the shaft 45 in a clockwise direction. As a result, the pins 48 and 49, mounted respectively on the distal ends of the ejection arms 46 and 47, push the disk 32 to eject the same toward the disk insertion hole.

Figure 5:
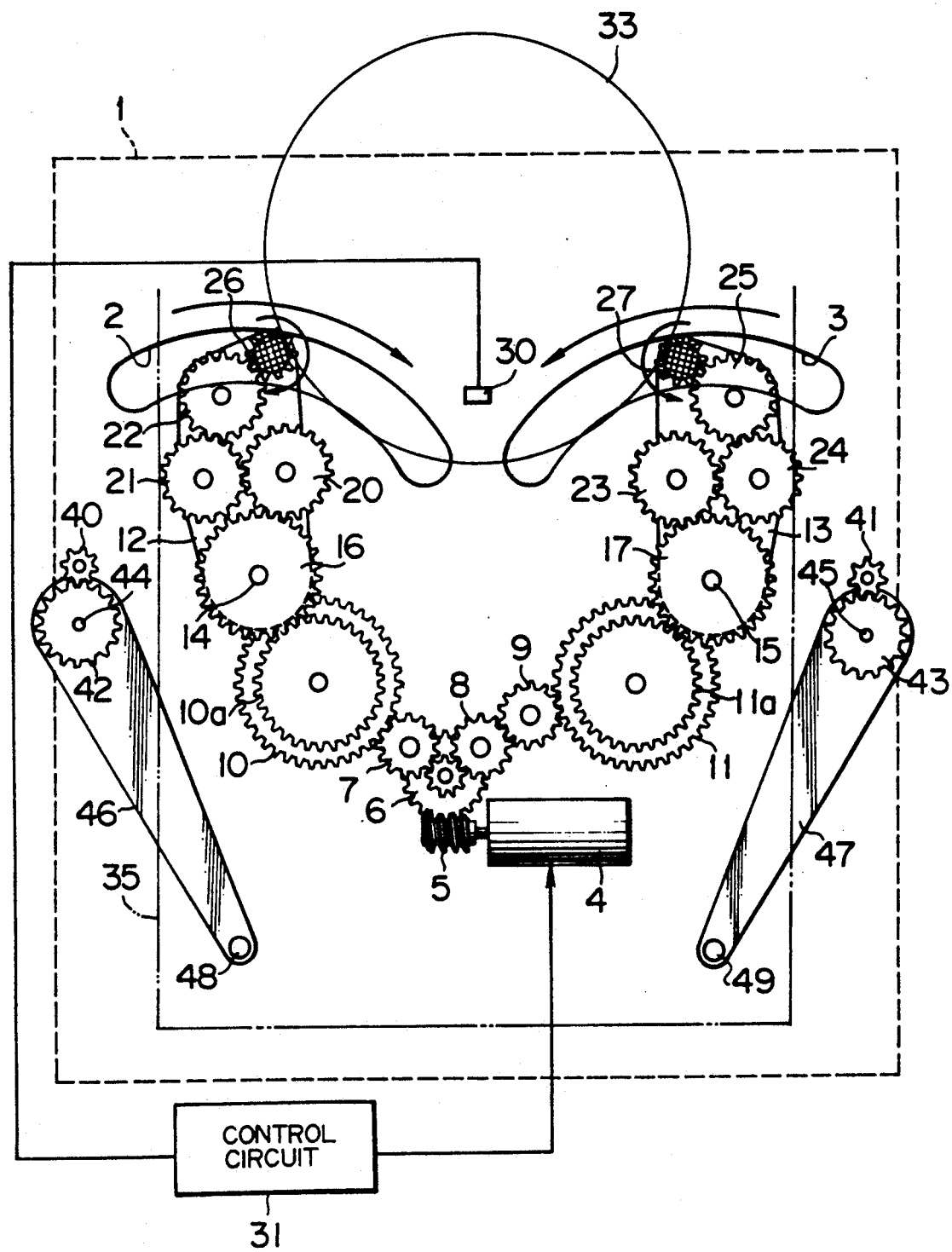
Figure 6:
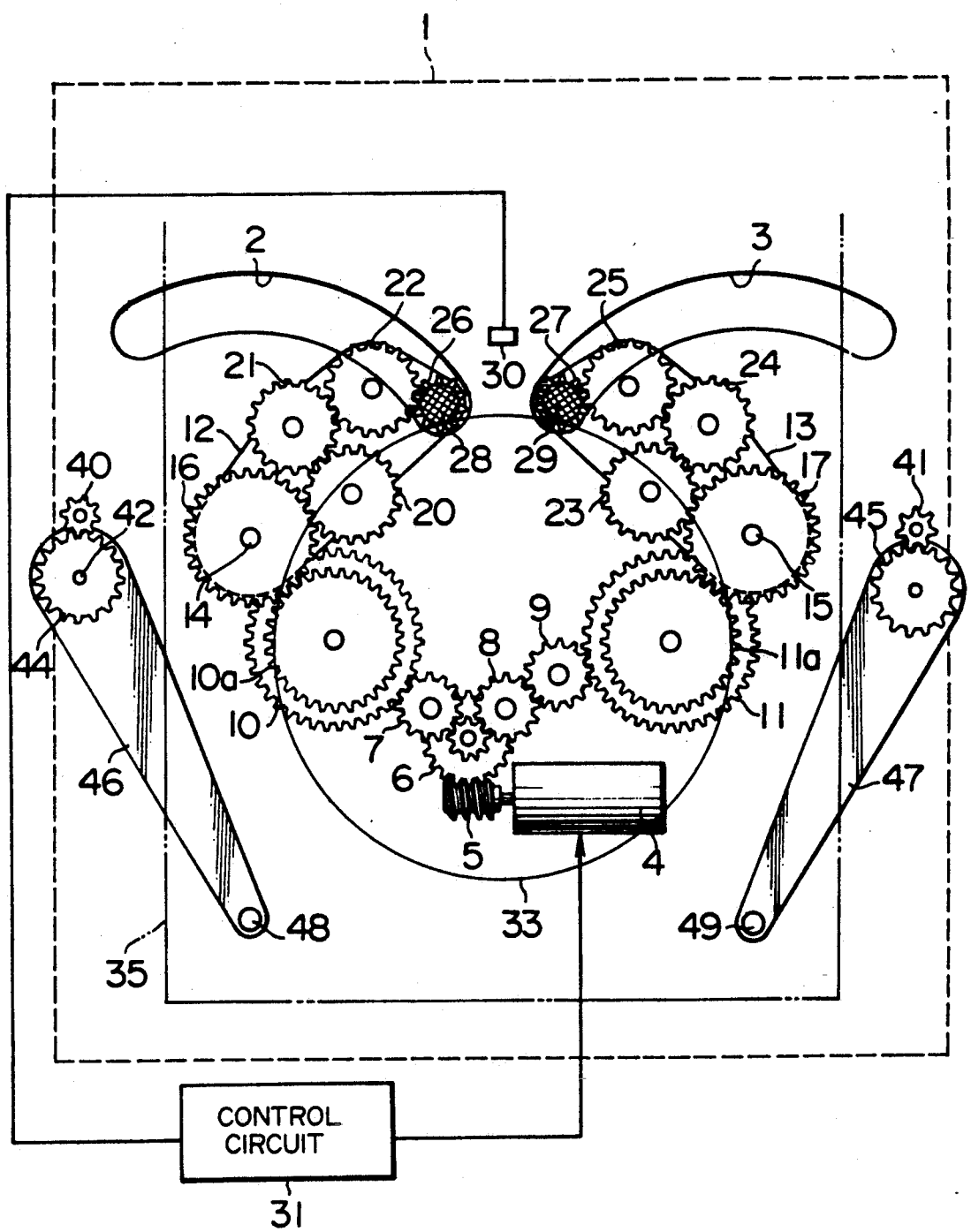

FIGS. 5 and 6 show conditions or states in which a small-diameter disk (compact disk of 8 cm) 33 is inserted. When the small-diameter disk 33 is inserted into the disk insertion hole, the photo sensor 30 detects the disk 33, and the motor 4 begins to rotate in the first direction by the control circuit 31, so that the small-diameter disk 33 is transferred in the direction of arrow Y in the same manner as described above for the large-diameter disk 32. In the case where the large-diameter disk 32 and the small-diameter disk 33 are rotated by a common turntable, there is provided a judgment means for judging the diameter of the inserted disk. In accordance with the result of judgment of the disk diameter by this judgment means, the position of stop of the transfer of the disk is changed. The small-diameter disk 33 is ejected in the same manner as described above for the large-diameter disk 32.

In the above embodiment, even if the large-diameter disk or the small-diameter disk is inserted into the disk insertion hole in deviated relation to the center of this disk insertion hole to the right or the left, the disk can be brought into registry with the centerline by the pivotal movements of the arms 12 and 13 and the rotations of the rubber rollers 28 and 29.

As described above, in this embodiment, the disk loading is carried out not by contacting the rollers or other members to the faces of the disk 32, 33 but by contacting the rollers to the outer peripheral surface of the disk, and also the disk is ejected by pushing the outer peripheral surface of the disk by the pins 48 and 49. Therefore, damage to the face of the disk can be prevented.

Figure 7:
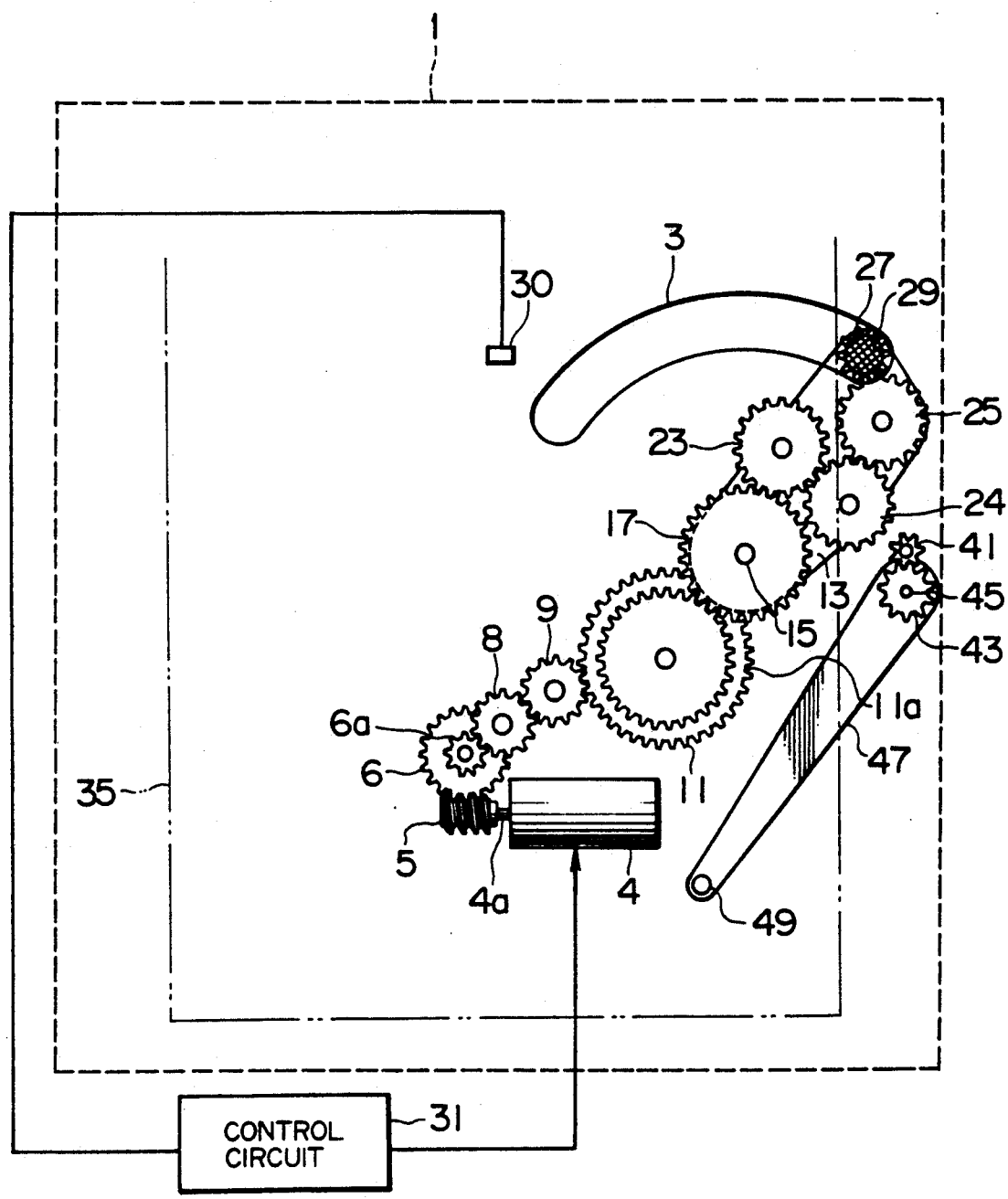
FIG. 7 is a top plan view of a modified form of the disk loading device of FIG. 1.

In the above embodiment, although the pair of mechanisms are arranged symmetrically with respect to the centerline of the loading device, one mechanism (which comprises the gears 7, 10, 16, 20, 21 and 22, the arm 12, the rubber roller 28, the gear 40, the clutch gear 42, the ejection arm 46 and the like) can be omitted, and the loading and ejection of the disk can be carried out by the single mechanism, as shown in FIG. 7. In this case, the disk is transferred along a guide surface 35.

As described above, in the present invention, the loading and ejection of the disk are carried out using only the outer peripheral surface of the disk, and therefore there is achieved an advantage that the face of the disk will not be damaged during the loading and ejection of the disk. Further, since the ejection is carried out using part of the loading mechanism, particularly the ejection mechanism can be made simple.

Figure 8:
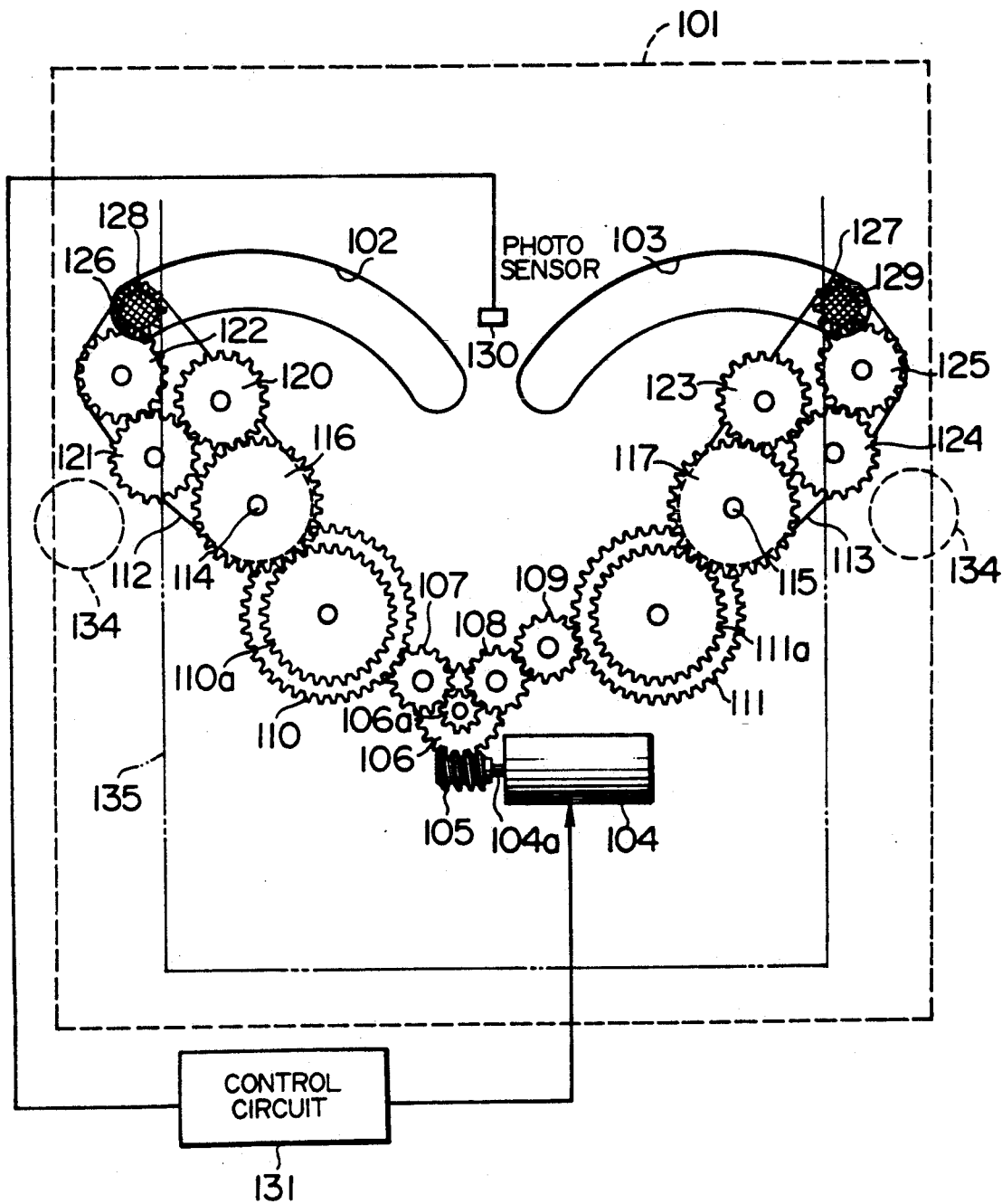
FIG. 8 is a top plan view of a disk loading device according to a second embodiment of the invention.

Next, a second embodiment of the present invention will now be described. FIG. 8 shows a disk loading device according to the second embodiment. In FIG. 8, arcuate guide slots 102 and 103 are formed through a base plate 101. A reversible motor 104 is mounted on a reverse surface of the base plate 101. A worm gear 105 is fixedly mounted on a rotatable shaft 104a of the motor 104, and a helical gear 106 is rotatably supported on the base plate 101, and is in mesh with the worm gear 105. Gears 107 and 108 are rotatably supported on the base plate 101, and are in mesh with a smaller gear portion 106a of the helical gear 106. A gear 109 is rotatably supported on the base plate 101, and is in mesh with the gear 108. Gears 110 and 111 are rotatably supported on the base plate 101, and are in mesh with the gears 107 and 109, respectively. Arms 112 and 113 are pivotally mounted on the base plate 101 through respective shafts 114 and 115. Clutch gears 116 and 117 are rotatable about the shafts 114 and 115, respectively. The clutch gears 116 and 117 are in mesh with smaller gear portions 110a and 111a of the gears 110 and 111, respectively. Springs 118 and 119 urges the clutch gears 116 and 117 toward the arms 112 and 113, respectively (see FIG. 9). Gears 120, 121 and 122 are rotatably supported on the arm 112. Gears 123, 124 and 125 are rotatably supported on the arm 113. Gears 126 and 127 are rotatably supported on the arms 112 and 113, respectively, and rubber rollers 128 and 129 are mounted on one ends of the gears 126 and 127, respectively. The rubber rollers 128 and 129 extend respectively through the guide slots 102 and 103, and are projected beyond the upper surface of the base plate 101.

Figure 9:
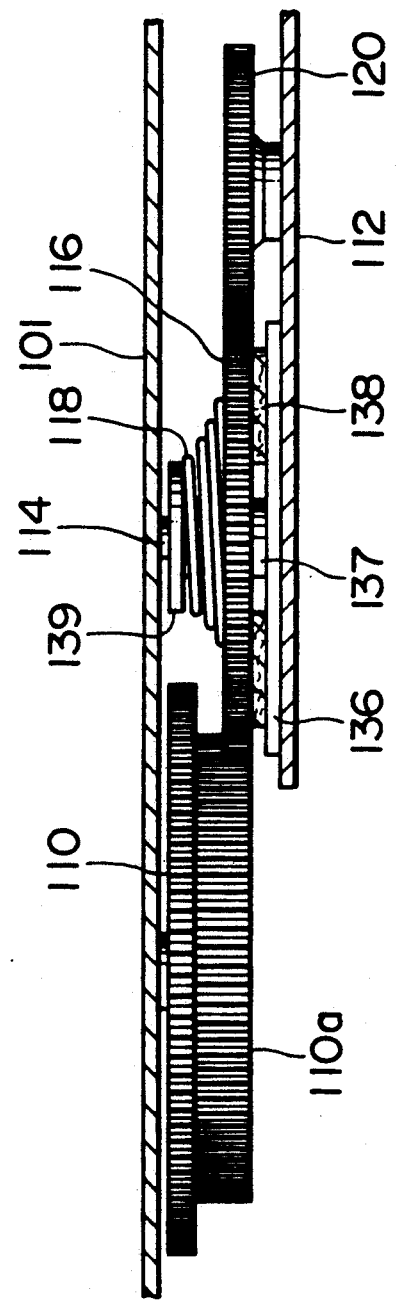
FIG. 9 is a side-elevational view showing a clutch gear portion of the disk loading device of FIG. 8.

FIG. 9 shows a portion of the loading device where the clutch gear 116 is provided. In FIG. 9, the arm 112 is rotatably supported on the base plate 101 through the shaft 114, and a plastic or resin plate 136 is mounted on the arm 112. A cylindrical shaft 137 is formed integrally on the central portion of the resin plate 136. Reference numeral 138 denotes a ring-shaped felt, and the clutch gear 116 is rotatably mounted on the cylindrical shaft 137. The spring 118 is wound around the cylindrical shaft 137, and a ring-shaped retainer plate 139 is fixedly secured to the distal end of the cylindrical shaft 137. The spring 118 is interposed between the retainer plate 139 and the clutch gear 116. The clutch gear 116 is urged by the spring 118, and the felt 138 is held between the clutch gear 116 and the resin plate 136.

In FIG. 8, a rotational drive force of the motor 104 is transmitted to the gear 126 with the rubber roller 128 sequentially via the worm gear 105, the helical gear 106, the gear 107, the gear 110, the gear 116, the gear 120, the gear 121 and the gear 122, so that the rubber roller 128 is rotated in a clockwise direction or in a counter-clockwise direction. Similarly, the rotational drive force of the motor 104 is transmitted to the gear 127 with the rubber roller 129 sequentially via the worm gear 105, the helical gear 106, the gear 108, the gear 109, the gear 111, the gear 117, the gear 123, the gear 124 and the gear 125, so that the rubber roller 129 is rotated in a counter-clockwise direction or in a clockwise direction. A photo sensor 130 detects the insertion of a disk, and the output of the photo sensor 130 is fed to a control circuit 131. When the photo sensor 130 detects the insertion of the disk, the motor 104 is rotated by the control circuit 131. Reference numeral 135 denotes a disk guide.

Figure 10:
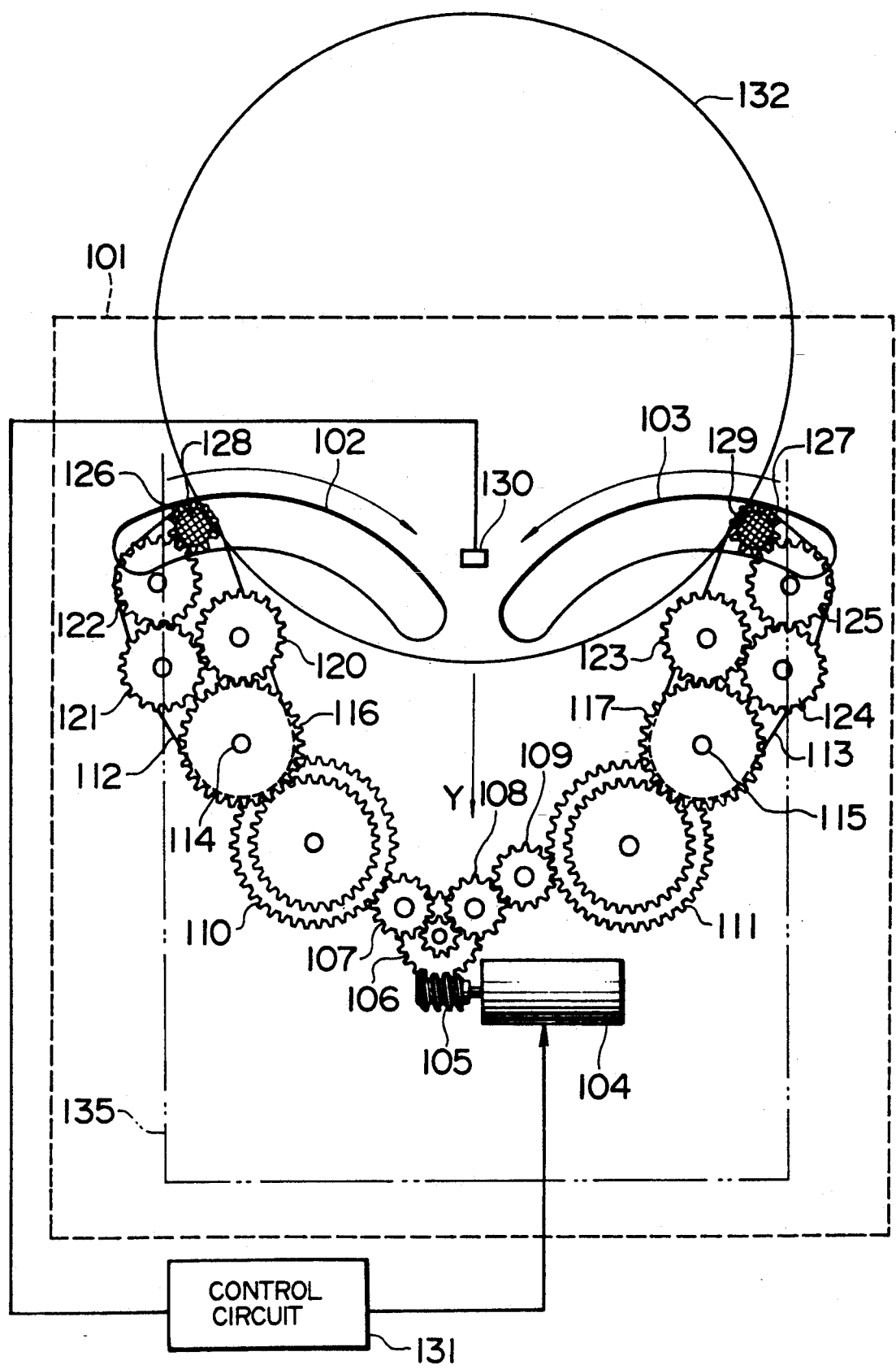
FIGS. 10 to 13 are views similar to FIG. 8, but showing the operation of the disk loading device of FIG. 8.
Figure 11:
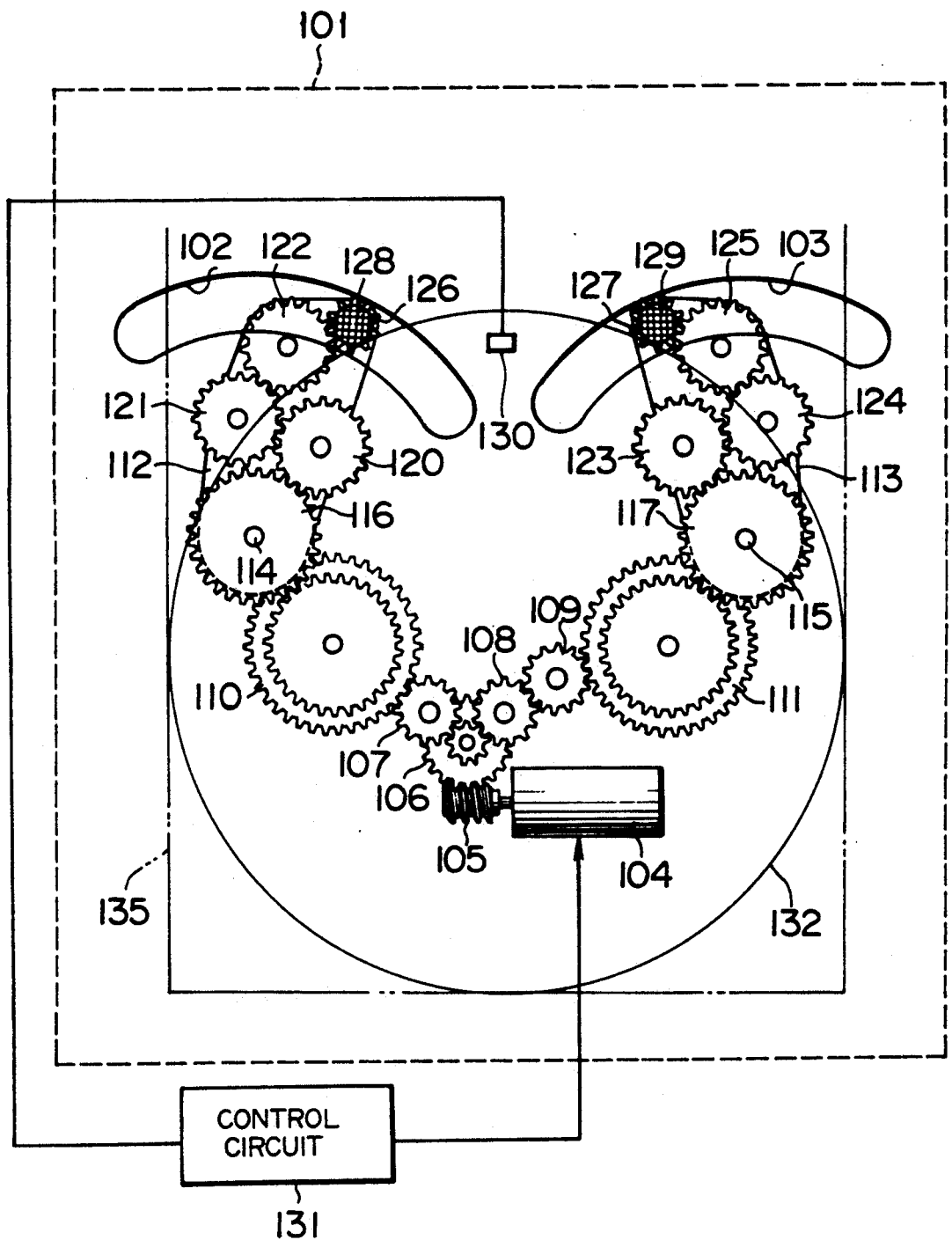

The operation of the above embodiment will now be described. FIG. 10 shows a condition in which a large-diameter disk (compact disk of 12 cm) 132 is inserted into a disk insertion hole. When the insertion of the disk 132 is detected by the photo sensor 130, the motor 104 begins to rotate in a first direction by the control circuit 131. The rotational drive force of the motor 104 is transmitted to the gear 126 with the rubber roller 128 sequentially via the worm gear 105, the helical gear 106, the gear 107, the gear 110, the gear 116, the gear 120, the gear 121 and the gear 122 to thereby rotate the rubber roller 128 in a clockwise direction, and at this time the arm 112 is pivotally moved about the shaft 114 in a clockwise direction. Also, the rotational drive force of the motor 104 is transmitted to the gear 127 with the rubber roller 129 sequentially via the worm gear 105, the helical gear 106, the gear 108, the gear 109, the gear 111, the gear 117, the gear 123, the gear 124 and the gear 125 to thereby rotate the rubber roller 129 in a counter-clockwise direction, and at this time the arm 113 is pivotally moved about the shaft 115 in a counterclockwise direction. When the motor 104 thus rotates in the first direction, the arms 112 and 113 are pivotally moved toward each other, and also the rubber rollers 128 and 129 rotate in opposite directions, respectively. As a result of the pivotal movements of the arms 112 and 113, the rotating rubber rollers 128 and 129 are brought into contact with the outer peripheral surface of the inserted disk 132 to move the disk 132 in a direction of arrow Y. FIG. 11 shows a condition or state immediately before the completion of the loading in the direction of arrow Y. When the disk 132 is transferred or moved to a predetermined position by the above loading mechanism, the energization of the motor 104 is stopped, so that the pivotal movements of the arms 112 and 113, as well as the rotations of the rubber rollers 128 and 129, are stopped. When the disk 132 is transferred to the predetermined position, the disk 132 is clamped to a turntable by a clamp mechanism, and is rotated to begin a reproduction operation.

Figure 12:
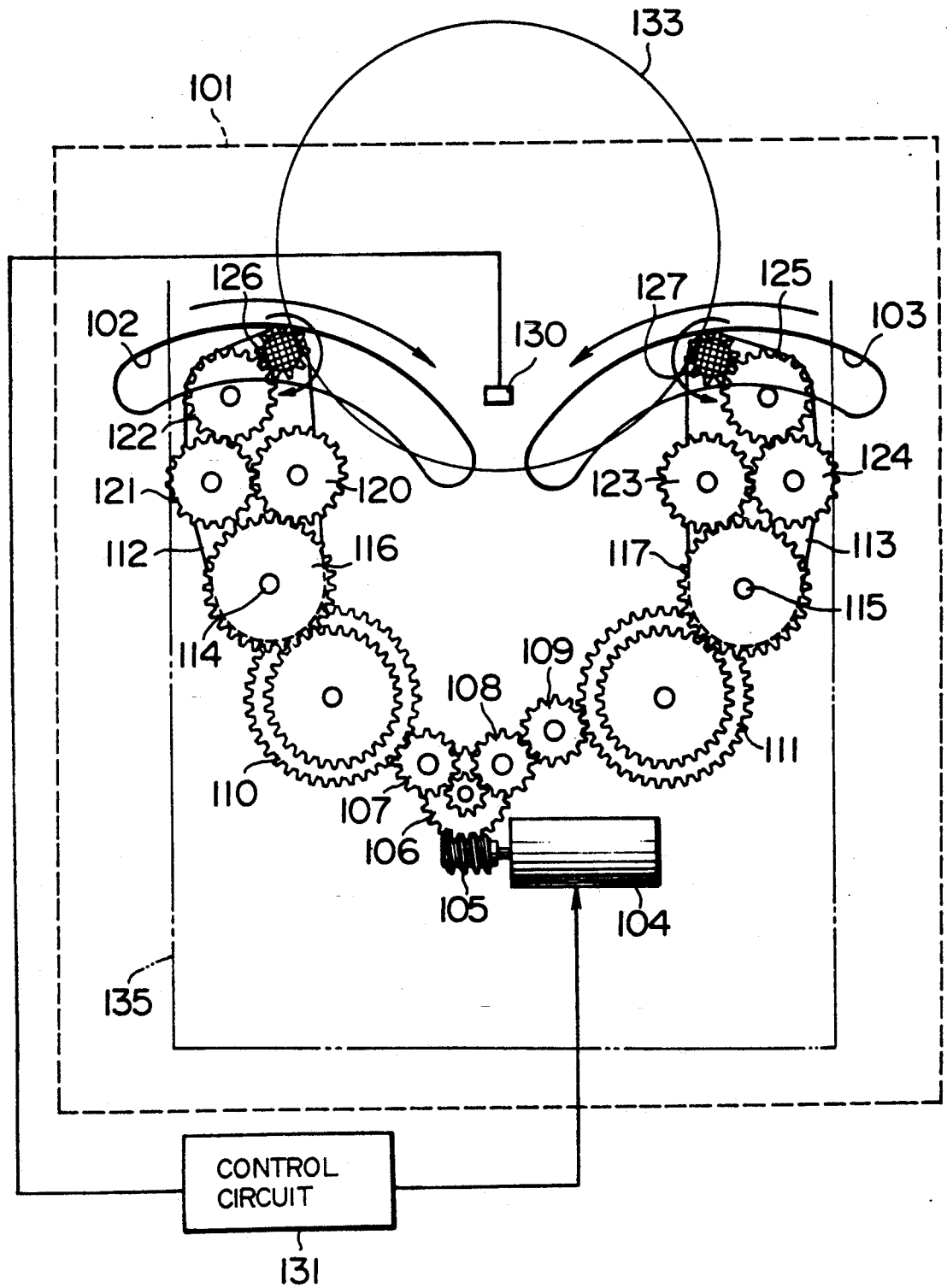
Figure 13:
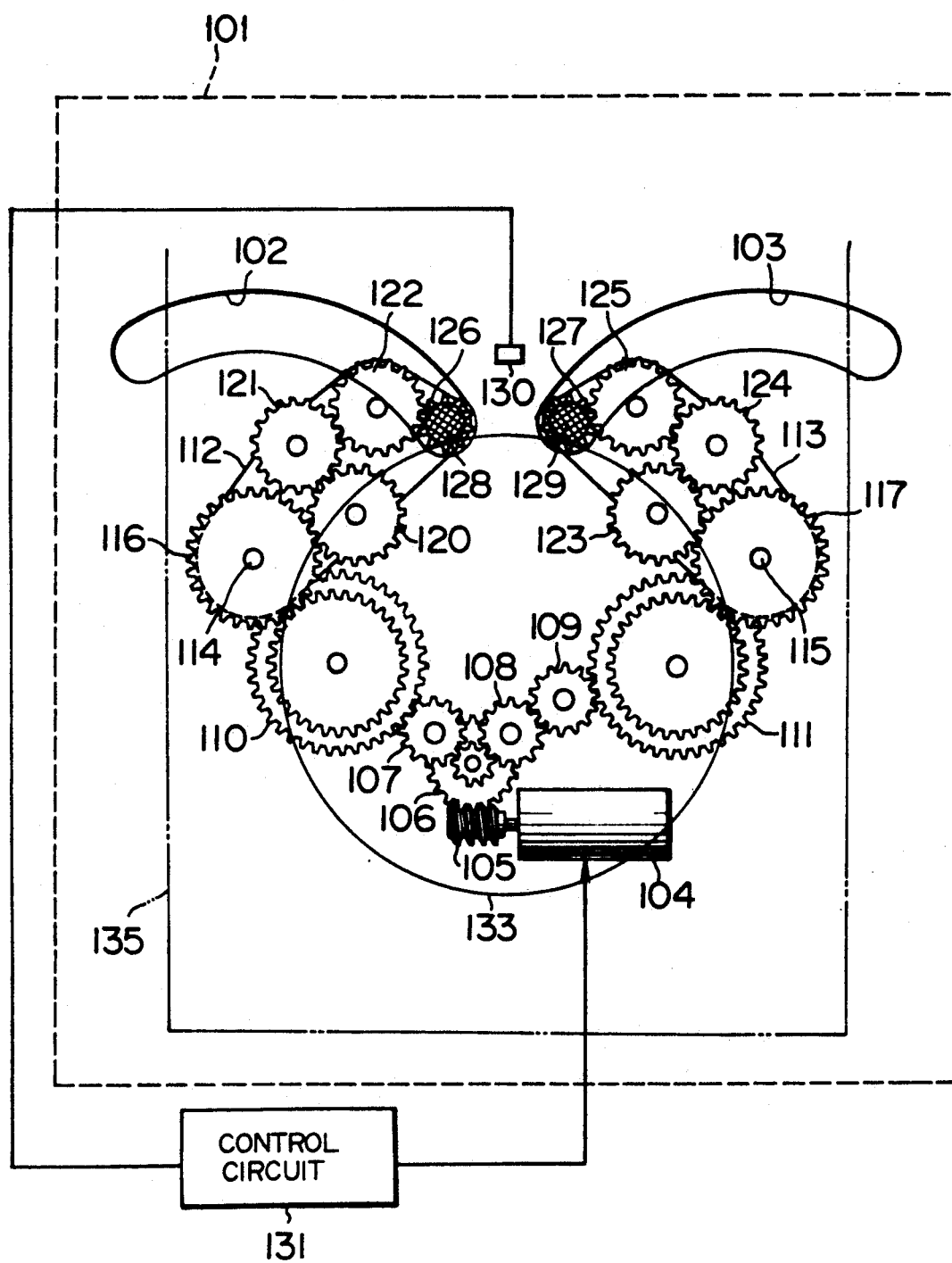

FIGS. 12 and 13 show conditions or states in which a small-diameter disk (compact disk of 8 cm) 133 is inserted. When the small-diameter disk 133 is inserted into the disk insertion hole, the photo sensor 130 detects the disk 133, and the motor 104 begins to rotate in the first direction by the control circuit 131, so that the small-diameter disk 133 is transferred in the direction of arrow Y in the same manner as described above for the large-diameter disk 132. In the case where the large-diameter disk 132 and the small-diameter disk 133 are rotated by a common turntable, there is provided a judgment means for judging the diameter of the inserted disk. In accordance with the result of judgment of the disk diameter by this judgment means, the position of stop of the transfer of the disk is changed.

In the above embodiment, even if the large-diameter disk or the small-diameter disk is inserted into the disk insertion hole in deviated relation to the center of this disk insertion hole to the right or the left, the disk can be brought into registry with the centerline by the pivotal movements of the arms 112 and 113 and the rotations of the rubber rollers 128 and 129.

In the above embodiment, when an ejection button is operated, an ejection signal is fed to the control circuit 131, so that the output shaft of the motor 104 is rotated in a second direction opposite to the first direction. As a result, the arms 112 and 113 are pivotally moved away from each other about the respective shafts 114 and 115. When the arms 112 and 113 reach the ends of the guide slots 102 and 103, respectively, the gears 121 and 124 are meshed with gears 134 (FIG. 8), respectively, so that the gears 134 are rotated. An ejection mechanism (not shown) is operated by the rotational drive forces of the gears 134 to push the outer peripheral surface of the disk, so that the disk is moved in a direction opposite to the arrow Y and is ejected.

As described above, in this embodiment, the disk loading is carried out not by contacting the rollers or other members to the faces of the disk 132, 133 but by contacting the rollers to the outer peripheral surface of the disk. Therefore, damage to the face of the disk can be prevented.

Figure 14:
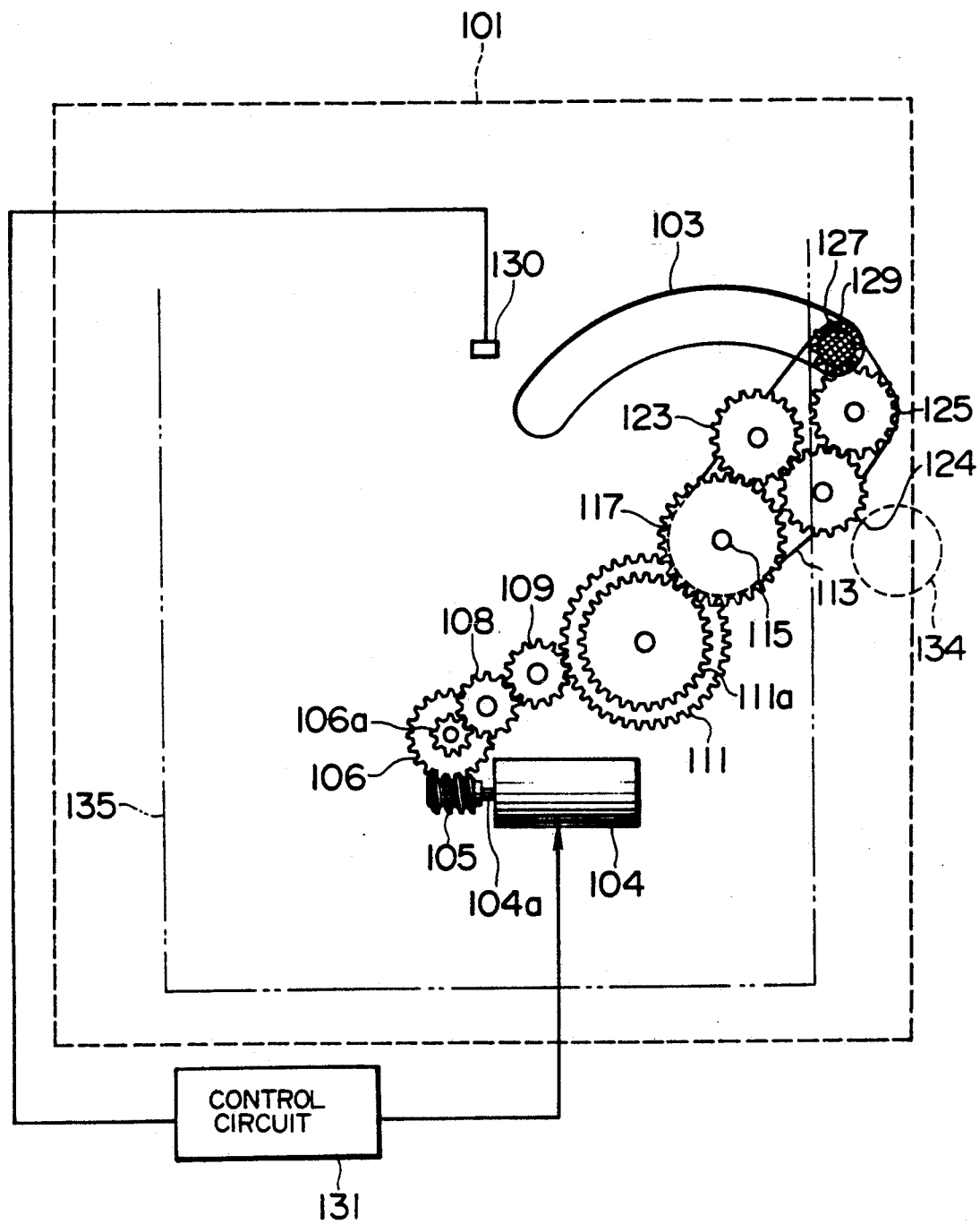
FIG. 14 is a modification of FIG. 8.

In the above embodiment, although the pair of mechanisms are arranged symmetrically with respect to the centerline of the loading device, one mechanism (which comprises the gears 107, 110, 116, 120, 121 and 122, the arm 112, the rubber roller 128 and left one of the gears 134) can be omitted, and the loading of the disk can be carried out by the single mechanism, as shown in FIG. 14. In this case, the disk is transferred along a guide surface 135.

As described above, in the present invention, the loading of the disk are carried out using only the outer peripheral surface of the disk, and therefore there is achieved an advantage that the face of the disk will not be damaged during the loading of the disk.

Figure 15:
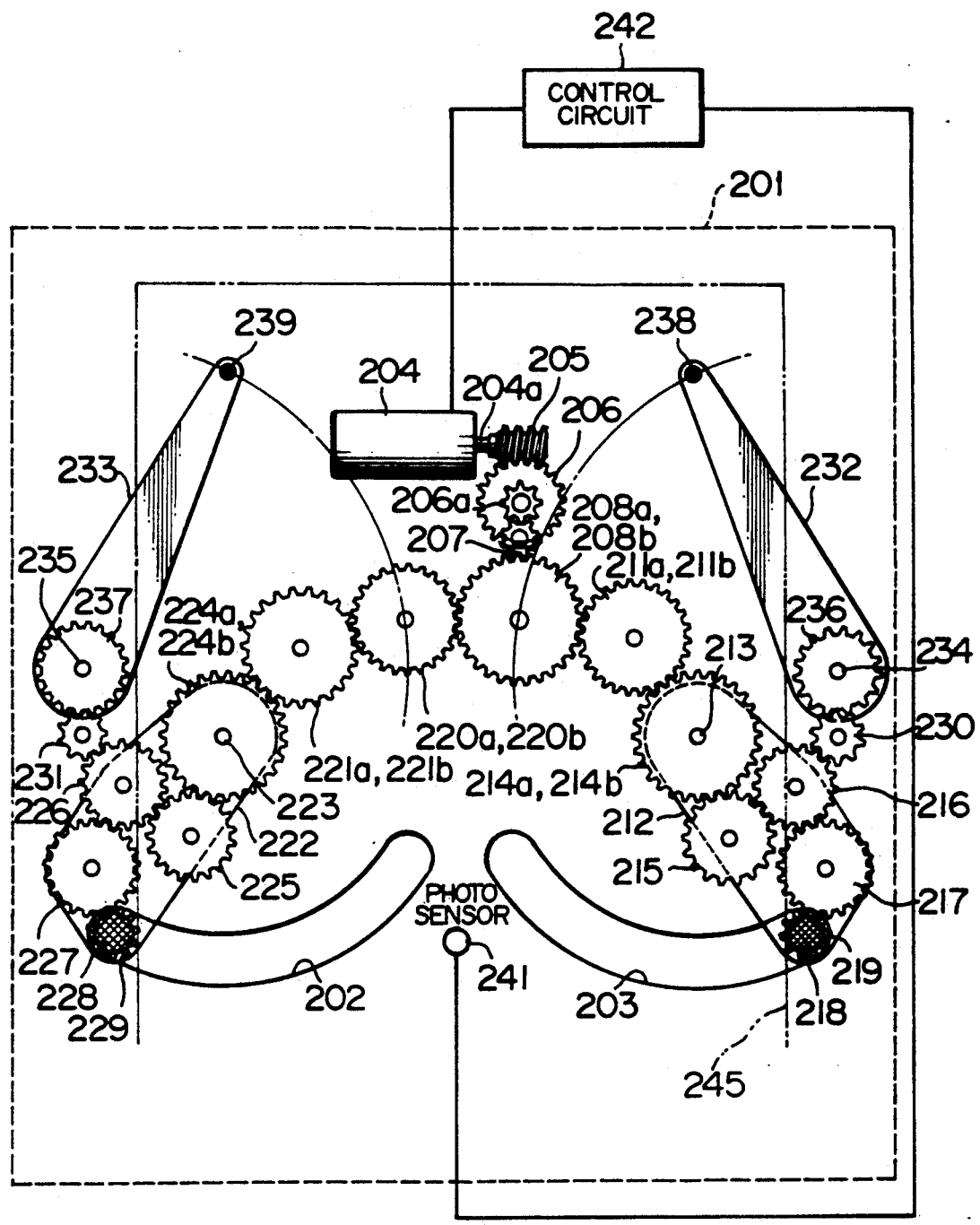
FIG. 15 is a top plan view of a disk loading device according to a third embodiment of the invention.
Figure 16:
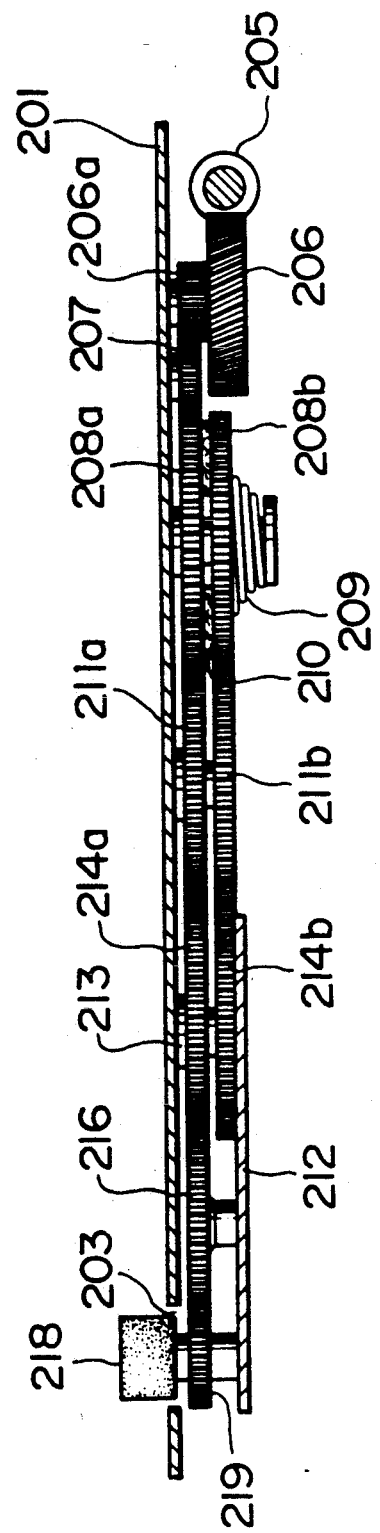
FIG. 16 is a side-elevational view of the disk loading device of FIG. 15.

Next, a third embodiment of the present invention will now be described. FIGS. 15 and 16 show a disk loading device according to the third embodiment. In FIGS. 15 and 16, arcuate guide slots 202 and 203 are formed through a base plate 201. A reversible motor 204 is mounted on a reverse surface of the base plate 201. A worm gear 205 is fixedly mounted on a rotatable shaft 204a of the motor 204. A helical gear 206 is rotatably supported on the base plate 201, and is in mesh with the worm gear 205. A gear 207 is rotatably supported on the base plate 201, and is in mesh with a smaller gear portion 206a of the helical gear 206. Gears 208a and 208b are rotatably supported on the base plate 201, and under the influence of a spring 209, the gear 208b is urged against the gear 208a through a felt 210. A clutch mechanism is constituted by the gears 208a and 208b, the spring 209 and the felt 210. Gears 211a and 211b are rotatably supported on the base plate 201, and the gear 211a is in mesh with the gear 208a, and the gear 211b is in mesh with the gear 208b. An arm 212 is rotatably mounted on a shaft 213, and a gear 214a is rotatably mounted on the shaft 213. The gear 214a is in mesh with the gear 211a. A gear 214b identical to the gear 214a is fixedly mounted on the arm 212. Gears 215, 216 and 217 are rotatably supported on the arm 212, and the gear 215 is in mesh with the gear 214a and the gear 216, and the gear 216 is in mesh with the gear 217. A rubber roller 218 is rotatably supported on the arm 212, and this rubber roller 218 has an integral gear 219 in mesh with the gear 217. Gears 220a and 220b and gears 221a and 221b are rotatably supported on the base plate 201. The gear 220a is in mesh with the gear 208a and the gear 221a, and the gear 220b is in mesh with the gear 208b and the gear 221b. An arm 222 is rotatably supported on the base plate 201 through a shaft 223. A gear 224a is rotatably mounted on the shaft 223, and is in mesh with the gear 221a. A gear 224b is fixedly mounted on the arm 222, and like the gears 214a and 214b, the gears 224a and 224b constitute a clutch mechanism. Gears 225, 226 and 227 are rotatably supported on the arm 222. The gear 225 is in mesh with the gear 224a and the gear 226, and the gear 227 is in mesh with the gear 226. A rubber roller 228 is rotatably supported on the arm 222, and this rubber roller 228 has an integral gear 229 in mesh with the gear 227. Gears 230 and 231 are rotatably supported on the base plate 201, and are meshingly engageable respectively with the gears 216 and 226 rotatably supported respectively on the arms 212 and 222. Ejection arms 232 and 233 are rotatably supported on shafts 234 and 235, respectively. Clutch gears 236 and 237 are rotatably supported on the shafts 234 and 235, respectively. The clutch gears 236 and 237 are urged respectively against the ejection arms 232 and 233 by respective resilient members, such as a spring, to constitute clutch mechanisms. Pins 238 and 239 are mounted on the distal ends of the ejection arms 232 and 233, respectively.

In FIGS. 15 and 16, the rotational drive force of the motor 204 is transmitted to the gear 219 with the rubber roller 218 sequentially via the worm gear 205, the helical gear 206, the gear 207, the gear 208a, the gear 211a, the gear 214a, the gear 215, the gear 216 and the gear 217, so that the rubber roller 218 is rotated in a clockwise direction or in a counterclockwise direction. Also, the rotational drive force of the motor 204 is transmitted to the clutch gear 236 sequentially via the worm gear 205, the helical gear 206, the gear 207, the gear 208a, the gear 211a, the gear 214a, the gear 215, the gear 216 and the gear 230. Also, the rotational drive force of the motor 204 is transmitted to the arm 212 sequentially via the worm gear 205, the helical gear 206, the gear 207, the gear 208b, the gear 211b and the gear 214b, so that the arm 212 is pivotally moved about the shaft 213 in a clockwise direction or in a counterclockwise direction. Similarly, the rotational drive force of the motor 204 is transmitted to the gear 229 with the rubber roller 228 sequentially via the worm gear 205, the helical gear 206, the gear 207, the gear 208a, the gear 220a, the gear 221a, the gear 224a, the gear 225, the gear 226 and the gear 227, so that the rubber roller 228 is rotated in a clockwise direction or in a counterclockwise direction. Also, the rotational drive force of the motor 204 is transmitted to the clutch gear 237 sequentially via the worm gear 205, the helical gear 206, the gear 207, the gear 208a, the gear 220a, the gear 221a, the gear 224a, the gear 225, the gear 226 and the gear 231. Also, the rotational drive force of the motor 204 is transmitted to the arm 222 sequentially via the worm gear 205, the helical gear 206, the gear 207, the gear 208b, the gear 220b, the gear 221b and the gear 224b, so that the arm 222 is pivotally moved about the shaft 223 in a clockwise direction or in a counterclockwise direction. A photo sensor 241 detects the insertion of a disk, and the output of the photo sensor 241 is fed to a control circuit 242. When the photo sensor 231 detects the insertion of the disk, the motor 204 is rotated by the control circuit 242. Reference numeral 245 denotes a disk guide.

Figure 17:
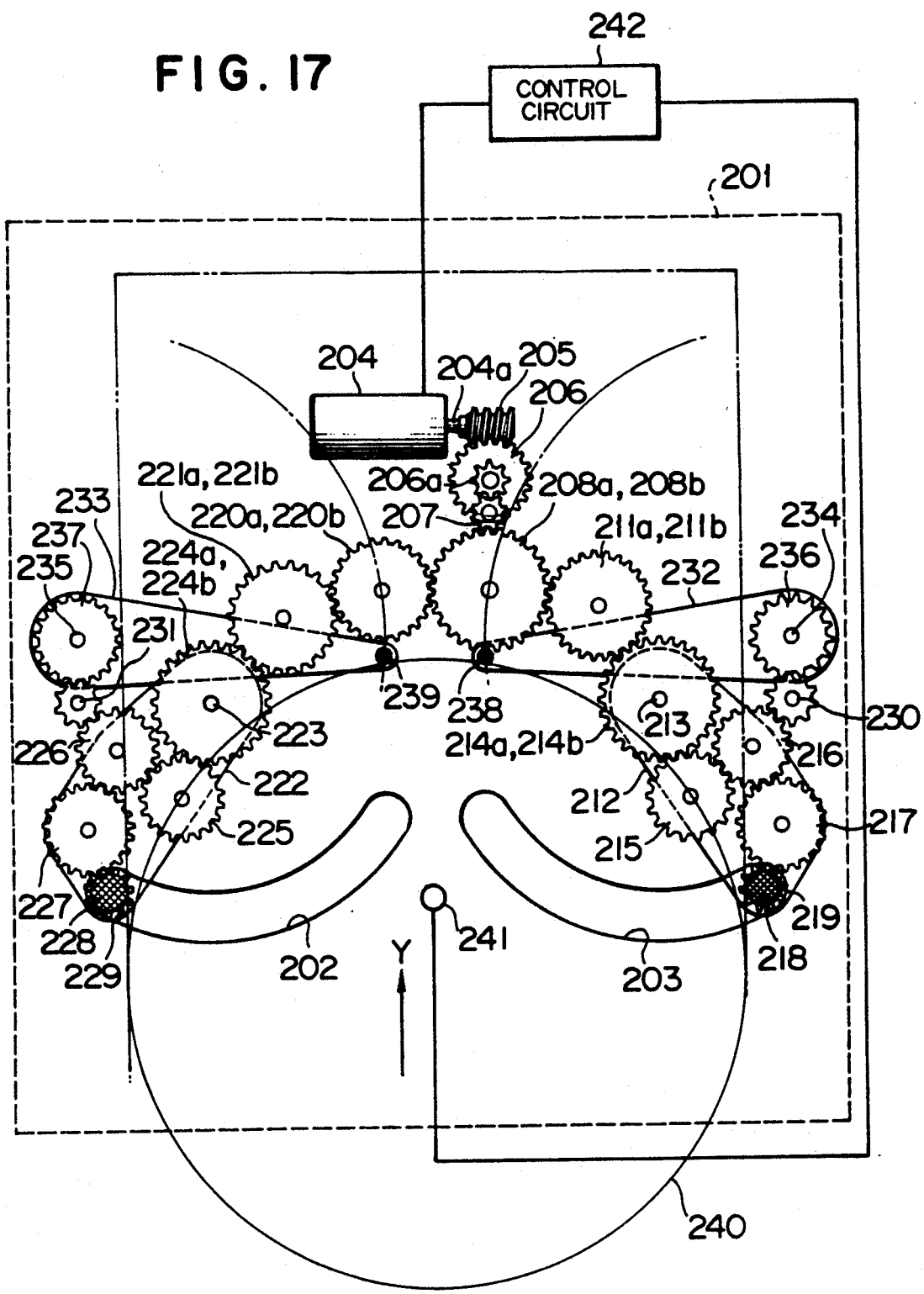
FIGS. 17 and 18 are views similar to FIG. 15, but showing the operation of the disk loading device of FIG. 15.
Figure 18:
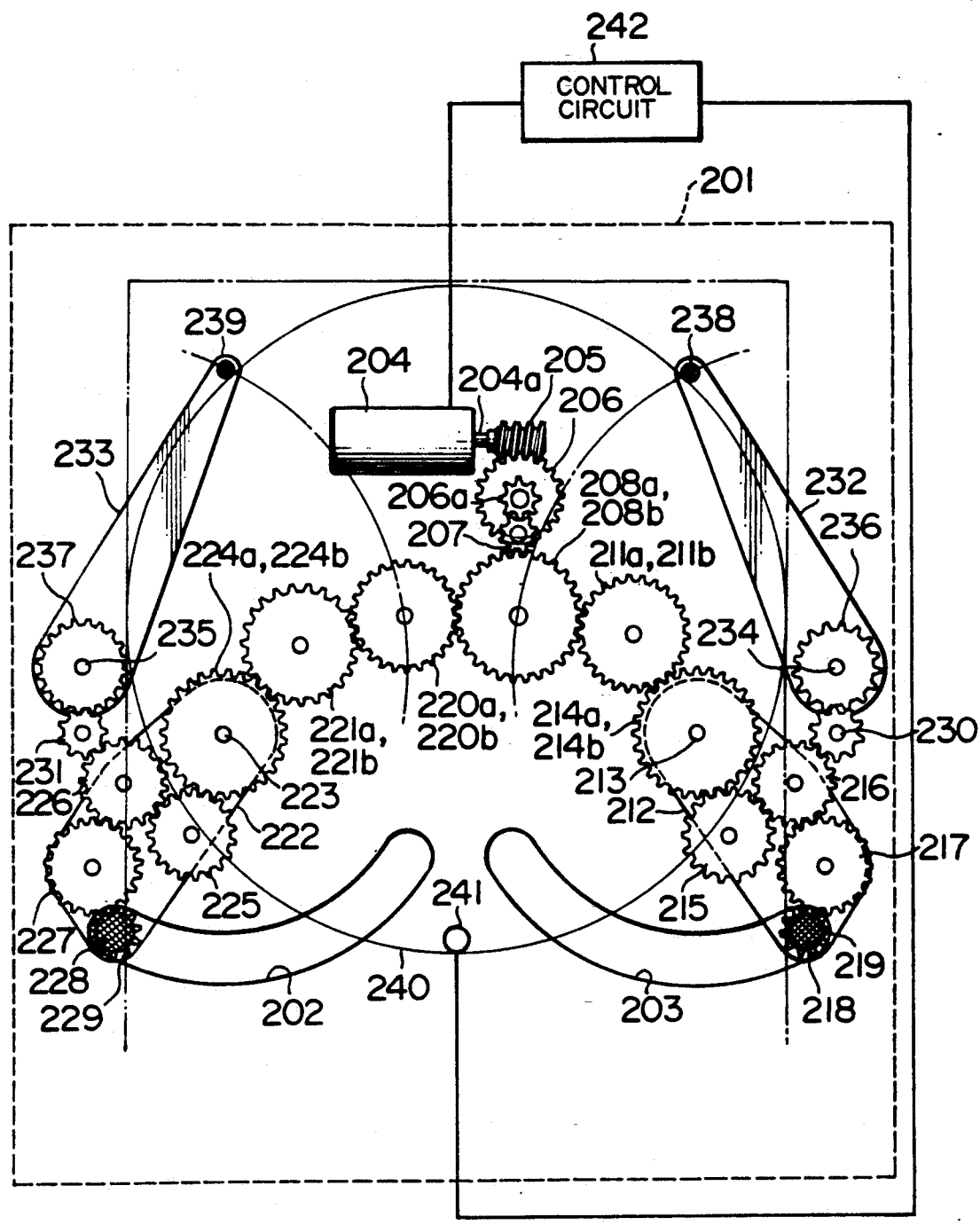
Figure 19:
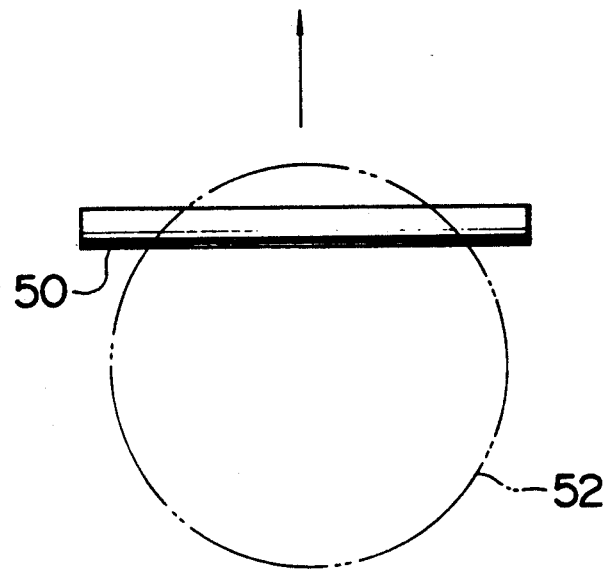
FIG. 19 is a schematic top plan view of a conventional disk loading device.
Figure 20:
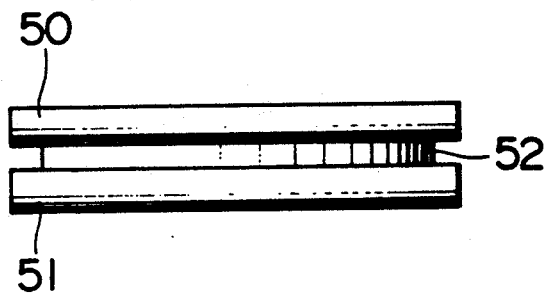
FIG. 20 is a schematic front-elevational view of the conventional disk loading device of FIG. 19.

The operation of the above embodiment will now be described. FIG. 17 shows a condition in which a large-diameter disk (compact disk of 12 cm) 240 is inserted from a disk insertion hole. When the insertion of the disk 240 is detected by the photo sensor 241, the motor 204 begins to rotate in a first direction by the control circuit 242. The rotational drive force of the motor 204 is transmitted to the gear 219 with the rubber roller 218 sequentially via the worm gear 205, the helical gear 206, the gear 207, the gear 208a, the gear 211a, the gear 214a, the gear 215, the gear 216 and the gear 217 to thereby rotate the rubber roller 218 in a clockwise direction. Also, the rotational drive force of the motor 204 is transmitted to the arm 212 sequentially via the worm gear 205, the helical gear 206, the gear 207, the gear 208b, the gear 211b and the gear 214b to thereby pivotally move the arm 212 in a clockwise direction. Also, the rotational drive force of the motor 204 is transmitted to the gear 229 with the rubber roller 228 sequentially via the worm gear 205, the helical gear 206, the gear 207, the gear 208a, the gear 220a, the gear 221a, the gear 224a, the gear 225, the gear 226 and the gear 227 to thereby rotate the rubber roller 228 in a counterclockwise direction. Also, the rotational drive force of the motor 204 is transmitted to the arm 222 sequentially via the worm gear 205, the helical gear 206, the gear 207, the gear 208b, the gear 220b, the gear 221b and the gear 224b to thereby pivotally move the arm 222 about the shaft 223 in a counterclockwise direction. When the motor 204 thus rotates in the first direction, the arms 212 and 222 are pivotally moved toward each other, and the rubber rollers 218 and 228 rotate in the opposite directions, respectively. As a result of the pivotal movements of the arms 212 and 222, the rotating rubber rollers 218 and 228 are brought into contact with the outer peripheral surface of the inserted disk 240 to move the disk 240 in a direction of arrow Y. FIG. 18 shows a condition or state immediately before the completion of the loading in the direction of arrow Y. When the disk 240 is transferred or moved to a predetermined position by the above loading mechanism, the energization of the motor 204 is stopped, so that the pivotal movements of the arms 212 and 222, as well as the rotations of the rubber rollers 218 and 228, are stopped. When the disk 240 is transferred to the predetermined position, the disk 240 is clamped to a turntable by a clamp mechanism, and is rotated to begin a reproduction operation.

In the disk reproduction condition shown in FIG. 18, when an ejection switch is turned on, the motor 204 begins to rotate in a reverse direction. Therefore, the arms 212 and 222 are pivotally moved away from each other about the respective shafts 213 and 223. When the arms 212 and 222 reach the ends of the guide slots 202 and 203, respectively, the gears 216 and 226 are meshed with the gears 230 and 231, respectively. As a result, the rotational drive force of the motor 204 is transmitted to the gears 230 and 231 through the respective gears 216 and 226, and is further transmitted to the clutch gears 236 and 237, so that the clutch gear 236 rotates in a counterclockwise direction whereas the clutch gear 237 rotates in a clockwise direction. In response to the rotations of the clutch gears 236 and 237, the ejection arm 232 is pivotally moved about the shaft 234 in a counterclockwise direction, and the ejection arm 233 is pivotally moved about the shaft 235 in a clockwise direction. As a result, the pins 238 and 239, mounted respectively on the distal ends of the ejection arms 232 and 233, push the disk 240 to eject the same toward the disk insertion hole.

Although the above is the operation for the large-diameter disk, the loading and ejection of a small-diameter disk (compact disk of 8 cm) are similar to those of the large-diameter disk.

In the above embodiment, even if the large-diameter disk or the small-diameter disk is inserted into the disk insertion hole in deviated relation to the center of this disk insertion hole to the right or the left, the disk can be brought into registry with the centerline by the pivotal movements of the arms 212 and 222 and the rotations of the rubber rollers 218 and 228.

As described above, in this embodiment, the disk loading is carried out not by contacting the rollers or other members to the faces of the disk 240 but by contacting the rollers to the outer peripheral surface of the disk, and also the disk is ejected by pushing the outer peripheral surface of the disk by the pins 238 and 239. Therefore, damage to the face of the disk can be prevented. Further, in this embodiment, the rotational drive force of the motor 204 is transmitted to the two arms 212 and 222 via one clutch mechanism, constituted by the gears 208a and 208b, to thereby pivotally move the two arms 212 and 222. Therefore, the pivotal movements of the two arms 212 and 222 are symmetrical with respect to the centerline, and the disk can be transferred along the centerline.

As described above, in the present invention, the disk loading and/or the disk ejection are carried out using only the outer peripheral surface of the disk, and therefore there is achieved an advantage that the face of the disk will not be damaged during the loading and/or the ejection of the disk. Further, in the present invention, the drive force of the motor is transmitted to the two arms through one clutch mechanism so as to pivotally move the two arms, and therefore advantageously, the movements of the two arms are symmetrical with respect to the centerline. Further, since the ejection is carried out using part of the loading mechanism, particularly the ejection mechanism can be made simple.

What is claimed is:

1. A disk loading device comprising:
   at least one roller for transferring a disk;
   at least one roller drive means for rotating said at least one roller around an axis of said at least one roller to transfer said disk by a force applied by said at least one roller to said disk upon a rotation of said at least one roller when a peripheral surface of said at least one roller is contacted with an outer peripheral surface of said disk;
   at least one roller movement means for moving said at least one roller toward said disk to contact said peripheral surface of said at least one roller against said outer peripheral surface of said disk to contact said outer peripheral surface of said disk at a predetermined pressure,
   said at least one roller movement means including a frictional engagement means for providing a slippable coupling between said roller movement means and said roller drive means, thereby enabling a pressing of said peripheral surface of said roller against said outer peripheral surface of said disk at said predetermined force, said frictional engagement means including an input part coupled to said roller drive means and an output part rotatably supporting said axis of said roller and frictionally engaged with said input part.

2. A disk loading device according to claim 1, in which said roller movement means is driven by a rotational drive force of said roller drive means.

3. A disk loading device comprising:

a pair of rollers for transferring a disk;

roller drive means for rotating said pair of rollers in opposite directions around axes of said pair of rollers to transfer said disk by a force applied by said pair of rollers to said disk upon a rotation of said pair of rollers when peripheral surfaces of said pair of rollers are contacted with an outer peripheral surface of the disk;

roller movement means for moving said pair of rollers toward and away from each other to contact said peripheral surfaces of said pair of rollers against said outer peripheral surface of said disk to contact said outer peripheral surface of said disk at a predetermined pressure, said roller movement means including a pair of frictional engagement means for providing a slippable coupling between said roller movement means and said roller drive means, thereby enabling a pressing of said peripheral surfaces of said pair of rollers against said outer peripheral surface of said disk at said predetermined force, each of said pair of frictional engagement means including an input part coupled to said roller drive means and an output part rotatably supporting one of said axes of said pair of rollers and frictionally engaged with said input part; and ejection means, comprising a pair of ejection arms, for moving said pair of ejection arms toward and away from each other;

wherein said pair of rollers are brought by said roller movement means into contact with said outer peripheral surface of said disk so as to transfer said disk by rotational drive forces of said pair of rollers, and said pair of ejection arms are urged by said ejection means against the outer peripheral surface of said disk so as to eject said disk.

4. A disk loading device according to claim 3, in which said roller movement means comprises a pair of pivotal arms on which said pair of rollers are rotatably mounted and a pair of drive force transmission mechanisms for transmitting rotational drive forces from said pair of frictional engagement means to said pair of rollers, each of said pair of frictional engagement means comprises a clutch gear rotatable about an axis coinciding with an axis of pivotal movement of a corresponding one of said pair of pivotal arms, and said roller drive means comprises motor means for rotating said pair of clutch gears.

5. A disk loading device according to claim 3, in which said ejection means comprises a pair of ejection drive gears meshingly engageable with said roller drive means, a pair of pivotal ejection arms, and a pair of ejection clutch gears rotatable about respective axes coinciding respectively with axes of pivotal movement of said pair of ejection arms, said pair of ejection clutch gears being in mesh with said pair of ejection drive gears, respectively.

6. A disk loading device comprising:

a roller for transferring a disk;

roller drive means for rotating said roller around an axis of said roller to transfer said disk by a force applied by said roller to said disk upon a rotation of said roller when a peripheral surface of said roller is contacted with an outer peripheral surface of said disk;

roller movement means for moving said roller toward and away from a path of travel of said disk to contact a peripheral surface of said roller against said outer peripheral surface of said disk to contact said peripheral surface of said disk at a predetermined pressure, said roller movement means including a frictional engagement means for providing a slippable coupling between said roller movement means and said roller drive means, thereby enabling a pressing of said peripheral surface of said roller against said outer peripheral surface of said disk at said predetermined force, said frictional engagement means having an input part coupled to said roller drive means and an output part rotatably supporting said axis of said roller and frictionally engaged with said input part; and disk guide means for guiding said disk along said path of travel of said disk.

7. A disk loading device according to claim 6, in which said roller movement means is driven by a rotational drive force of said roller drive means.

8. A disk loading device according to claim 6, in which said roller movement means comprises a pivotal arm on which said roller is rotatably mounted and drive force transmission means for transmitting a rotational drive force of said frictional engagement means to said roller, said frictional engagement means comprises a clutch gear rotatable about an axis coinciding with an axis of pivotal movement of said arm, and said roller drive means comprises motor means for rotating said clutch gear.

9. A disk loading device comprising:

a pair of rollers for transferring a disk;

roller drive means for rotating said pair of rollers in opposite directions, respectively, around axes of said pair of rollers to transfer said disk by a force applied by said pair of rollers to said disk upon a rotation of said pair of rollers when peripheral surfaces of said pair of rollers are contacted with an outer peripheral surface of the disk; and roller movement means for moving said pair of rollers toward and away from each other to contact said peripheral surfaces of said pair of rollers against said outer peripheral surface of said disk to contact said peripheral surface of said disk at a predetermined pressure, said roller movement means including a pair of frictional engagement means for providing a slippable coupling between said roller movement means and said roller drive means, thereby enabling a pressing of said peripheral surfaces of said pair of rollers against said outer peripheral surface of said disk at said predetermined force, each of said pair of frictional engagement means having an input part coupled to said roller drive means and a output part rotatably supporting one of said axes of said pair of rollers and frictionally engaged with said input part.

10. A disk loading device according to claim 9, in which said roller movement means comprises a pair of pivotal arms on which said pair of rollers are rotatably mounted and a pair of drive force transmission mechanisms for transmitting a rotational drive force of said pair of frictional engagement means to said pair of rollers, each of said pair of frictional engagement means comprises a clutch gear rotatable about an axis coinciding with an axis of pivotal movement of one of said pivotal arms, and said motor drive means comprises motor means for rotating said pair of clutch gears.

11. A disk loading device comprising:

a pair of rollers for transferring a disk;

roller drive means for rotating said pair of rollers by the rotational drive force of said motor around axes of said pair of rollers to transfer said disk by a force applied by said pair of rollers to said disk upon a rotation of said pair of rollers when peripheral surfaces of said pair of rollers are contacted with an outer peripheral surface of said disk; and a pair of roller movement mechanisms for respectively moving said pair of rollers toward and away from a path of travel of said disk to contact said peripheral surfaces of said pair of rollers against said outer peripheral surface of said disk to contact said outer peripheral surface of said disk at a predetermined pressure, each of said pair of roller movement mechanisms including a frictional engagement means for providing slippable coupling between said each of said pair of roller movement mechanisms and said roller drive means, thereby enabling a pressing of said peripheral surface of said roller against said outer peripheral surface of said disk at said predetermined force, each of said frictional engagement means having an input part coupled to said roller drive means and an output part rotatably supporting said axis of said roller and frictionally engaged with said input part.

12. A disk loading device according to claim 11, in which each of said roller movement mechanisms comprises a roller drive mechanism for rotating one of said pair of rollers, the rotational drive force of said roller drive means being transmitted to said pair of roller drive mechanisms via said pair of frictional engagement means.

13. A disk loading device according to claim 11, further comprising an ejection arm which is operatively engageable with said roller drive means so as to be pivotally moved to eject said disk.

14. A disk loading device according to claim 11, in which each of said pair of roller movement mechanisms comprises (i) an arm on which one of said pair of rollers is rotatably mounted, said arm being pivotal about a shaft, (ii) a gear rotatably mounted on said shaft, and (iii) a gear train for transmitting a rotational drive force of said gear to said one of said pair of rollers.

15. A disk loading device according to claim 14, in which each of said pair of roller movement mechanisms further comprises a second gear which is fixedly mounted on said arm and which is coaxial with said shaft, the rotational drive force of said motor being transmitted to said arm via said second gear, thereby pivotally moving said arm.

* * * * *